United States Patent
Inukai et al.

(10) Patent No.: US 9,636,591 B2
(45) Date of Patent: May 2, 2017

(54) GAME SYSTEM, GAME DEVICE, GAME CONTROL METHOD, AND PROGRAM

(71) Applicant: Konami Digital Entertainment Co., Ltd., Minato-ku, Tokyo (JP)

(72) Inventors: Shinsaku Inukai, Kawasaki (JP); Hideo Ueda, Matsudo (JP)

(73) Assignee: KONAMI DIGITAL ENTERTAINMENT CO., LTD., Tokyo (JP)

( * ) Notice: Subject to any disclaimer, the term of this patent is extended or adjusted under 35 U.S.C. 154(b) by 275 days.

(21) Appl. No.: 14/477,570

(22) Filed: Sep. 4, 2014

(65) Prior Publication Data

US 2014/0378210 A1 Dec. 25, 2014

Related U.S. Application Data

(63) Continuation-in-part of application No. PCT/JP2013/055666, filed on Mar. 1, 2013.

(30) Foreign Application Priority Data

Mar. 7, 2012 (JP) ................................ 2012-050754

(51) Int. Cl.
*G06F 17/00* (2006.01)
*A63F 13/814* (2014.01)
*A63F 13/46* (2014.01)

(52) U.S. Cl.
CPC ............ *A63F 13/814* (2014.09); *A63F 13/46* (2014.09); *A63F 2300/61* (2013.01); *A63F 2300/634* (2013.01); *A63F 2300/8047* (2013.01)

(58) Field of Classification Search
USPC ..................................................... 463/16–25
See application file for complete search history.

(56) References Cited

U.S. PATENT DOCUMENTS

2004/0048655 A1* 3/2004 Yoshioka ............ G07F 17/3262
463/23
2008/0167121 A1 7/2008 Maeda et al.
(Continued)

FOREIGN PATENT DOCUMENTS

JP 2006-230853 A 9/2006
JP 3871338 B2 1/2007
(Continued)

OTHER PUBLICATIONS

International Search Report dated May 28, 2013, issued by the International Searching Authority in counterpart International application No. PCT/JP2013/055666.
(Continued)

*Primary Examiner* — Ronald Laneau
(74) *Attorney, Agent, or Firm* — Sughrue Mion, PLLC

(57) ABSTRACT

A game system includes a game progresser, a storage, a game reproducer, and a changer. The game progresser is configured to control game progress in accordance with a player's instruction information. The storage is configured to store a game-play-history of a first-player in accordance with a first instruction information of the first-player. The game reproducer is configured to reproduce a first game progress of the first player based on the game-play-history, during a second game progress progressed by the game progresser in accordance with a second instruction information of a second-player. The changer is configured to change at least one of: control on the first game progress of the first-player reproduced by the game reproducer; and control on the second game progress of the second-player to be progressed in accordance with the second instruction information, with reference to at least one of first and second player's game situations.

13 Claims, 14 Drawing Sheets

(56) References Cited

U.S. PATENT DOCUMENTS

| | | | |
|---|---|---|---|
| 2008/0167122 A1 | 7/2008 | Maeda et al. | |
| 2008/0182637 A1* | 7/2008 | Yoshizawa | G07F 17/32 |
| | | | 463/16 |
| 2009/0011831 A1 | 1/2009 | Yamada | |
| 2015/0072793 A1* | 3/2015 | Okabayashi | A63F 13/58 |
| | | | 463/42 |

FOREIGN PATENT DOCUMENTS

| | | |
|---|---|---|
| JP | 2008-167824 A | 7/2008 |
| JP | 2008-167825 A | 7/2008 |
| JP | 2009-504348 A | 2/2009 |
| JP | 2011-188920 A | 9/2011 |
| JP | 2013-099437 A | 5/2013 |
| WO | 2007/022487 A2 | 2/2007 |

OTHER PUBLICATIONS

Communication dated Apr. 25, 2014, issued by the Japanese Patent Office in counterpart Japanese application No. 2012-050754.
Aurora Feint II: The Arena: asynchronous game, character progression, SNS, Completed iPhone Puzzle RPG, detail description, [online], Jan. 25, 2010, [retrieved on Apr. 21, 2014], Internet <URL, https://web.archive.Org/web/20I00I25I44458/http://www.appbank.net/2008/II/22/iphone- application/2465 .php>.

\* cited by examiner

FIG. 12

| TUNE ID | TUNE DATA | ARROW NUMBER | TIME | ARROW TYPE | ... |
|---------|-----------|--------------|------|------------|-----|
| 1 | ... | 1 | t1 | RIGHTWARD | ... |
| | | 2 | t2 | DOWNWARD | ... |
| | | ... | ... | ... | ... |
| ... | ... | ... | ... | ... | ... |

FIG. 13

| JUDGMENT CRITERIA | JUDGMENT RESULT |
|-------------------|-----------------|
| 0.0 to 0.2 | PERFECT |
| 0.21 to 0.4 | GREAT |
| 0.41 to 0.8 | GOOD |
| 0.81 OR GREATER | BAD |

FIG. 14

| JUDGMENT RESULT | SCORE |
|-----------------|-------|
| PERFECT | 100 |
| GREAT | 70 |
| GOOD | 50 |
| BAD | 0 |

FIG. 15

| PLAYER ID | TUNE ID | ARROW NUMBER | JUDGMENT RESULT | ... |
|---|---|---|---|---|
| 1 | 1 | 1 | PERFECT | ... |
| | | 2 | GOOD | ... |
| ... | ... | ... | ... | ... |

FIG. 16

| PLAYER ID | HEALTH VALUE | ... |
|---|---|---|
| 1 | 80 | ... |
| 2 | 100 | ... |
| ... | ... | ... |

FIG. 17

| HEALTH VALUE | SCORE CORRECTION FACTOR |
|---|---|
| 100 | 100% |
| 80 to 99 | 90% |
| 50 to 79 | 75% |
| 0 to 49 | 50% |

FIG. 19

| PLAYER ID | TUNE ID | ARROW NUMBER | JUDGMENT RESULT | PRESSING DIRECTION | PRESSING TIME | ... |
|---|---|---|---|---|---|---|
| 1 | 1 | 1 | PERFECT | RIGHTWARD | t1 | ... |
| | | 2 | GOOD | DOWNWARD | t2 | ... |
| ... | ... | ... | ... | ... | ... | ... |

FIG. 20

| TUNE ID | PRESSING TIME | PRESSING POSITION | ... |
|---|---|---|---|
| 1 | t1 | x1, y1 | ... |
| | t2 | BOTTOM | ... |
| ... | ... | ... | ... |

FIG. 23

| PRESSING TIME | INPUT KEY | ACCELERATOR BUTTON | BRAKE BUTTON | ... |
|---|---|---|---|---|
| t1 | RIGHTWARD | ON | — | ... |
| t2 | RIGHTWARD | ON | — | |
| t3 | RIGHTWARD | ON | — | |
| t4 | — | ON | — | |
| t5 | — | — | — | |
| t6 | — | — | ON | |
| t7 | LEFTWARD | — | — | |
| t8 | LEFTWARD | ON | — | ... |
| ... | ... | ... | ... | ... |

FIG. 24

| PRESSING TIME | LEFT/RIGHT MOVEMENT | SPEED | ... |
|---|---|---|---|
| t1 | +1 | +1 | ... |
| t2 | +1 | +1 | ... |
| t3 | +1 | +1 | ... |
| t4 | — | +1 | ... |
| t5 | — | — | ... |
| t6 | — | −1 | ... |
| t7 | −1 | — | ... |
| t8 | −1 | +1 | ... |
| ... | ... | ... | ... |

GAME SYSTEM, GAME DEVICE, GAME CONTROL METHOD, AND PROGRAM

BACKGROUND OF THE INVENTION

Field of the Invention

The present invention relates to a game system, a game device, a game control method, and a program.

Description of the Related Art

A game system is provided in which a player plays by controlling the progress a game in response to instruction information input from the player. Such game systems include those having a function of storing the game-play-history of that player and then reproducing the game progress of that game.

Japanese Patent No. 3871338 discloses storing a game-play-history of a player in a motorcycle racing game and displaying the movement of the motorcycle based on the game-play-history, overlaid on the screen when another player is playing the game. In the reproduction of the game progress based on the game-play-history as noted above, because the reproduction of the game progress was faithful to the game-play-history, it has been only a display for other players to use as a reference and has been monotonous.

SUMMARY

In one embodiment, a game system may include, but is not limited to, a game progresser, a storage, a game reproducer, and a changer. The game progresser may be configured to control game progress in accordance with a player's instruction information. The storage may be configured to store a game-play-history of a first player in accordance with a first instruction information of the first player. The game reproducer may be configured to reproduce a first game progress of the first player based on the game-play-history, during a second game progress progressed by the game progresser in accordance with a second instruction information of a second player. The changer may be configured to change at least one of: control on the first game progress of the first player reproduced by the game reproducer; and control on the second game progress of the second player to be progressed in accordance with the second instruction information, with reference to at least one of a first player's game situation and a second player's game situation.

BRIEF DESCRIPTION OF THE DRAWINGS

The above features and advantages of the embodiments of the present invention will be more apparent from the following descriptions of certain illustrative embodiments taken in conjunction with the accompanying drawings, in which:

FIG. 12 is a table showing an example of data of a tune information stored in a tune information storage included in the game system in the second embodiment of the invention;

FIG. 13 is a table showing an example of data of a judgment criteria information stored in a judgment criteria storage included in the game system in the second embodiment of the invention;

FIG. 14 is a table showing an example of data of a score information stored in a score storage included in the game system in the second embodiment of the invention;

FIG. 15 is a table showing an example of data stored in a game-play-history storage included in the game system in the second embodiment of the invention;

FIG. 16 is a table showing an example of data of an attribute value information stored in an attribute value storage included in the game system in the second embodiment of the invention;

FIG. 17 is a table showing an example of data of a score correction factor information stored in a score correction factor storage included in the game system in the second embodiment of the invention;

FIG. 19 is a block diagram of another game system in a third embodiment of the invention;

FIG. 20 is a table showing an example of data of a game-play-history stored in a game-play-history storage included in the game system in the second embodiment of the invention;

FIG. 23 is a table showing an example of data of a game-play-history in a racing game stored in a game-play-history storage included in the game system in the second embodiment of the invention; and FIG. 24 is a table showing an example of data of a game-play-history in a racing game stored in a game-play-history storage included in the game system in the second embodiment of the invention.

DETAILED DESCRIPTION OF THE EMBODIMENTS

Figure 1:
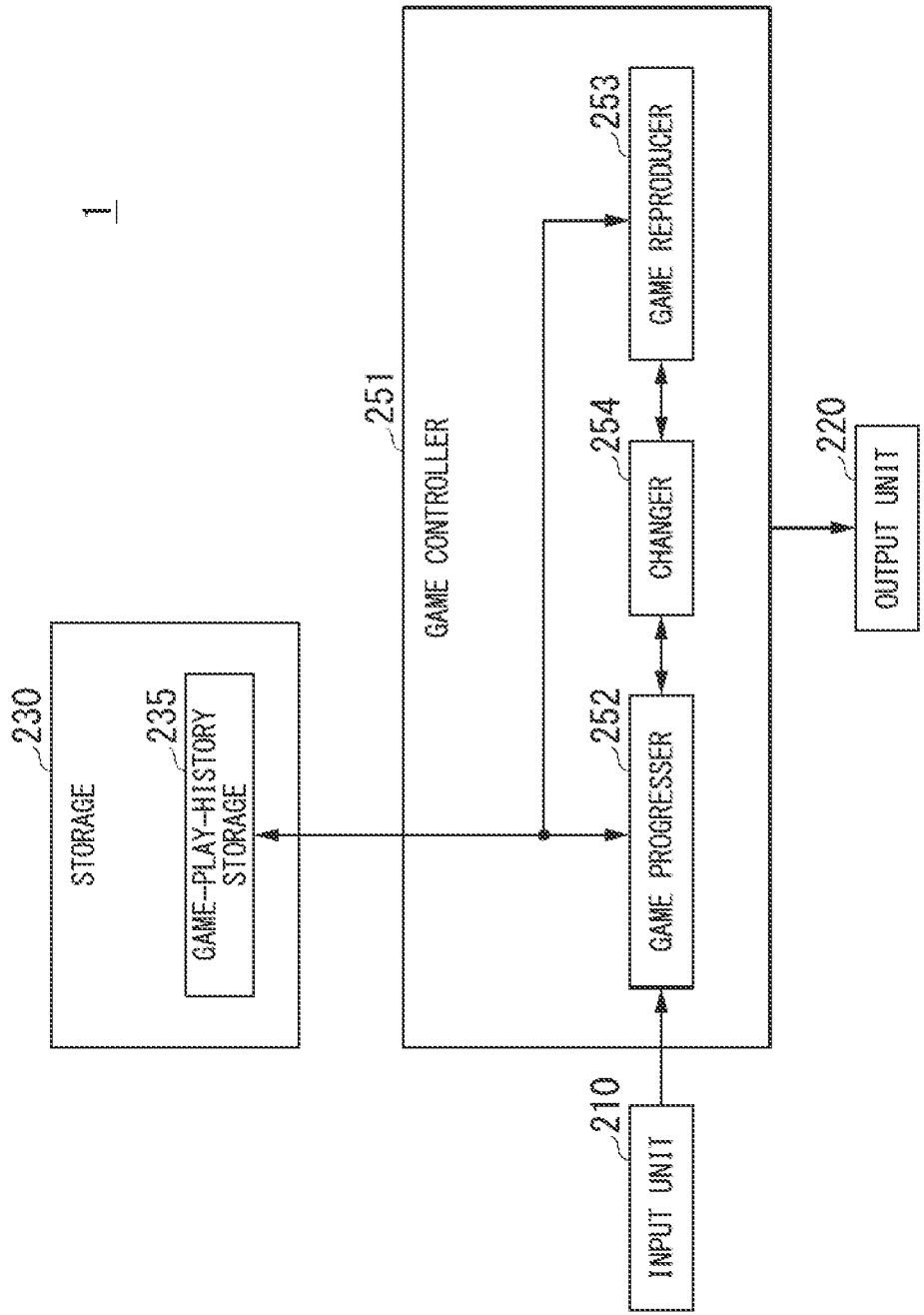
FIG. 1 is a block diagram of a game system in a first embodiment of the invention.

Embodiments of the invention will be described herein. Those skilled in the art will recognize that many alternative embodiments can be accomplished using the teaching of the embodiments and that the invention is not limited to the embodiments illustrated for explanatory purpose.

In one embodiment, a game system may include, but is not limited to, a game progresser, a storage, a game reproducer, and a changer. The game progresser may be configured to control game progress in accordance with a player's instruction information. The storage may be configured to store a game-play-history of a first player in accordance with a first instruction information of the first player. The game reproducer may be configured to reproduce a first game progress of the first player based on the game-play-history, during a second game progress progressed by the game progresser in accordance with a second instruction information of a second player. The changer may be configured to change at least one of: control on the first game progress of the first player reproduced by the game reproducer; and control on the second game progress of the second player to be progressed in accordance with the second instruction information, with reference to at least one of a first player's game situation and a second player's game situation.

In some cases, the changer may be configured to refer at least one of: information included in the game-play-history; and the second instruction information of the second player, to change the at least one control.

In some cases, the game system may further include, but is not limited to, an attribute value storage that is configured to store player attribute values associated with each player. The changer may be configured to change the at least one control, based on the attribute values of the player.

In some cases, the game-play-history may include, but is not limited to, a process of the first instruction information having input during the progress of the first game. The changer may be configured to change the at least one control, based on the process.

In some cases, the game-play-history may include, but is not limited to, a time at which the first instruction information has input during the progress of the game. The time is associated with the first instruction information. The changer may be configured to change the at least one control, based on the time.

In some cases, the game-play-history may include, but is not limited to, a judgment result of judging the first instruction based on a judgment criterion, the first instruction having input with respect to each of a plurality of game tasks in the game. The judgment result is associated with each of the plurality of game tasks. The changer is configured to change scoring process in accordance with the judgment result.

In the last-mentioned cases, the changer may be configured to change the judgment criterion. Also, the changer may be configured to compare a first judgment result and a second judgment result. The first judgment result is of judging, based on the game-play-history of the first player, the first instruction information having input with respect to one task in the game. The second judgment result is of judging, based on the judgment criteria, the second instruction information input from the second player with respect to the one task. Also, the changer may be configured to compare a first judgment result and a second judgment result. The first judgment result is of judging, based on the game-play-history of the first player, the first instruction information having input with respect to one task in the game. The second judgment result is of judging, based on the judgment criteria, the second instruction information input from the second player with respect to the one task.

In the foregoing cases, the changer may be configured to change a game point-providing process of providing points in accordance with the timing of input of instruction information during the progress of the game.

In another embodiment, a game device may include, but is not limited to, a game progresser, a game reproducer, and a changer. The game progresser may be configured to control game progress in accordance with a player's instruction information. The game reproducer may be configured to reproduce a first game progress of a first player based on a game-play-history in accordance with a first instruction information of the first player, during a second game progress progressed by the game progresser in accordance with a second instruction information of a second player. The changer may be configured to change at least one of: control on the first game progress of the first player reproduced by the game reproducer; and control on the second game progress of the second player to be progressed in accordance with the second instruction information, with reference to at least one of a first player's game situation and a second player's game situation.

In still another embodiment, a game control method may include, but is not limited to, a storing process, a reproducing process, and a changing process. The storing process is to store, in a storage, a game-play-history in accordance with a first instruction information of a first player. The reproducing process is to reproduce a first game progress of the first player based on the game-play-history, during a second game progress progressed in accordance with a second instruction information of a second player. The changing process is to change at least one of: control on the first game progress of the first player reproduced; and control on the second game progress of the second player to be progressed in accordance with the second instruction information, with reference to at least one of a first player's game situation and a second player's game situation.

In yet another embodiment, a computer program product including a program embodied on a non-transitory machine-readable medium and to be executed for performing a game control method. The program may include, but is not limited to, codes for reproducing, and codes for changing. The codes for reproducing are to reproduce a first game progress of a first player based on the game-play-history in accordance with a first instruction information of the first player, during a second game progress progressed in accordance with a second instruction information of a second player. The codes for changing are to change at least one of: control on the first game progress of the first player reproduced; and control on the second game progress of the second player to be progressed in accordance with the second instruction information, with reference to at least one of a first player's game situation and a second player's game situation.

In an additional embodiment, a game system may include, but is not limited to, a changer that is configured to change control on game progresses. The game progresses may include, but are not limited to: an asynchronous virtual game progress reproduced during a game played by a player with reference to an actual game-play-history actually played by at least one opponent; and a game progress based on instructions from the player, with reference to at least one of an opponent's game situation of the at least one opponent and a player's game situation of the player.

In a still additional embodiment, a game control method may include, but is not limited to, changing control on game progresses. The game progresses may include, but are not limited to: an asynchronous virtual game progress reproduced during a game played by a player with reference to an actual game-play-history actually played by at least one opponent; and a game progress based on instructions from the player, with reference to at least one of an opponent's game situation of the at least one opponent and a player's game situation of the player.

In yet an additional embodiment, a computer program product includes a program embodied on a non-transitory machine-readable medium and to be executed for performing a game control method. The program may include, but are not limited to, codes for changing control on game progresses. The game progresses may include, but are not limited to: an asynchronous virtual game progress reproduced during a game played by a player with reference to an actual game-play-history actually played by at least one opponent; and a game progress based on instructions from the player, with reference to at least one of an opponent's game situation of the at least one opponent and a player's game situation of the player.

First Embodiment

An overview of the present invention will first be described as the first embodiment of the present invention. FIG. 1 is a block diagram showing the general configuration of a game system 1 according to the present embodiment. The game system 1 includes an input unit 210, an output unit 220, a storage 230, and a game controller 251. The game system 1 can be implemented by any available a computer system which enables a player to play any computer game.

The input unit 210 may be implemented by any user interface that is configured to accept input of instruction information from a player. Typical examples of the input unit 210 may include, but are not limited to, a keyboard, buttons, or a touch panel or the like.

The output unit 220 may be implemented by any user interface that is configured to output any types of information in any way. Typical examples of the output unit 220 may include, but are not limited to, a display that is configured to display information such as images and/or a speaker or the like that outputs sound. In some cases, the input unit 210 and the output unit 220 may be separate. In other cases, the input unit 210 and the output unit 220 may be integrated into a touch panel that accepts operations from a user.

The storage 230 may be implemented by any storage medium which is available to store any information, or data. Typical examples of the storage 230 may include, but are not limited to, any recording mediums such as RAMs (random access memories), ROMs (read only memories), HDDs (hard disk drives), or any combinations thereof, which stores information used in the progress of a game. The storage 230 may include, but is not limited to, a game-play-history storage 235.

The game-play-history storage 235 can be configured to store a game-play-history of a game, in accordance with instruction information input to the input unit 210 from a first player.

The game controller 251 may be implemented by one or more software components combined with one or more processors such as a CPU (central processing unit) functioning as the control center. The game controller 251 is configured to control the progress of a game. The game controller 251 may include, but is not limited to, a game progresser 252, a game reproducer 253, and a changer 254.

The game progresser 252 may be implemented by one or more software components combined with one or more processors. The game progresser 252 is configured to control the progress of a game in accordance with instruction information input to the input unit 210 from a player. For example, the game progresser 252 controls the progress of a game in accordance with instruction information input to the input unit 210 from either a first player or a second player. The game progresser 252 also stores in the game-play-history storage 235 a game-play-history in accordance with instruction information input to the input unit 210 by the player.

The game reproducer 253 may be implemented by one or more software components combined with one or more processors. The game reproducer 253 is configured to read out the game-play-history stored in the game-play-history storage 235 and to reproduce the progress of the game played by a first player, based on the game-play-history read out from the game-play-history storage 235, wherein the reproduction is made during game progress controlled by the game progresser 252 in accordance with instruction information input from a second player. The game controller 251 is configured to reproduce the progress of the game played asynchronously by the first player, during game progress by a second player playing the game.

The changer 254 may be implemented by one or more software components combined with one or more processors. The changer 254 is configured to change the control of the game progress, based on the game situation of the first player or the second player. In some cases, the changer 254 may be configured to change, in accordance with the game situation of the first player and/or the second player, the control on the game progress by the game progresser 252 where the game progress is made in accordance with instruction information input from the second player, and/or to change the control on the game progress reproduced by the game reproducer 253 based on a game-play-history in the game-play-history storage 235. The game controller 251 may be configured to change, when causing progress of a game in which a first player and a second player compete asynchronously, the control on the progress of the game by the second player in accordance with information indicating the game-play-history in the game-play-history storage 235, and/or to change the control on the progress of the game by the first player, where the progress is reproduced based on a game-play-history in the game-play-history storage 235 in accordance with instruction information input from the second player. In other cases, the game controller 251 may be configured to change, in accordance with attribute values of the first and second players, the control on the game progress by the first player reproduced based on a game-play-history and/or to control on game progress by a second player progressing in accordance with instruction information.

The term "game" will mean either or both the game by the first player and the game by the second player.

In related art, when a second player plays a game, if a plurality of players are progressing asynchronously through a game played against an opponent by reproduction of the game progress of a first player based on a game-play-history, the actual game progress of the game by the first player was faithfully reproduced. In contrast, in the present embodiment, even when a plurality of players is playing a game asynchronously, the players can, in accordance with their mutual game situations, mutually interfere with the game progress of other players. This can prevent a monotonous game based on a game-play-history and enable realistic and diversely varying control of the game progress.

Figure 2:
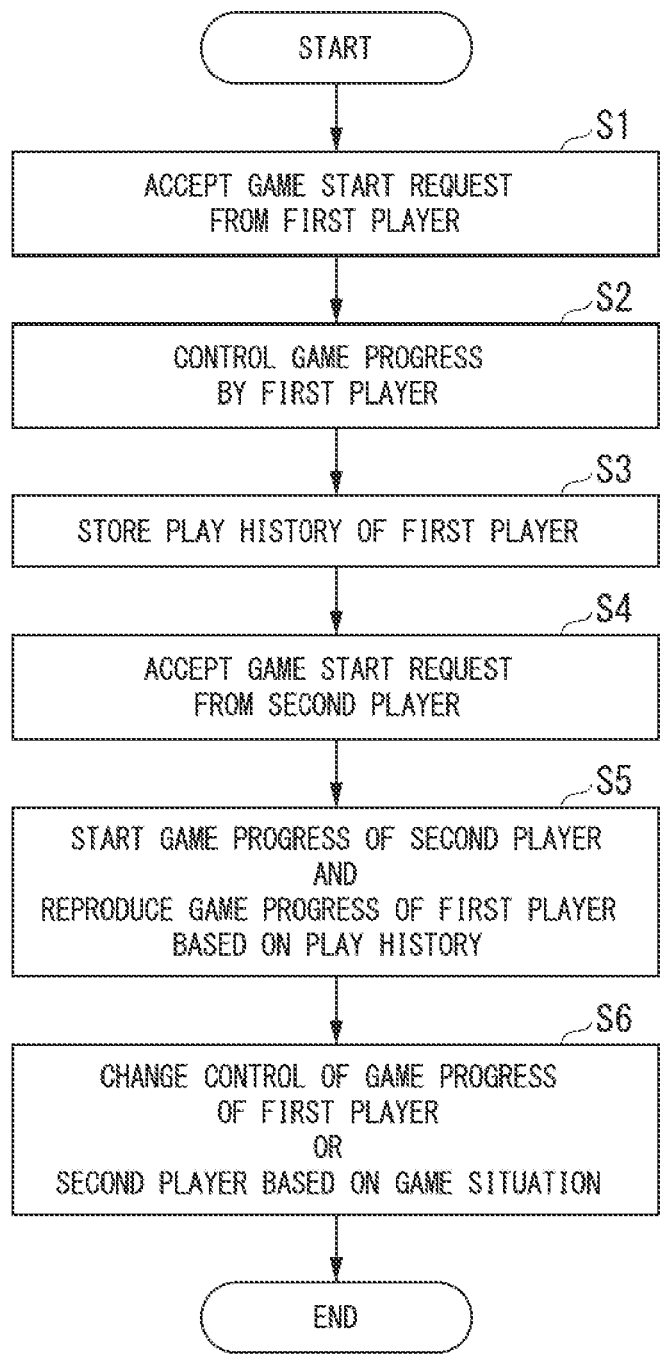
FIG. 2 is a flow chart showing a typical example of a series of operations performed by the game system in the first embodiment of the invention.

An example of the operation of the game system 1 of the present embodiment will now be described. FIG. 2 is a flowchart showing an example of the operation of the game system 1 of the present embodiment.

First, when the first player inputs instruction information that is a game start request to the input unit 210 (step S1), the game progresser 252 displays a game screen on the output unit 220, which is a display, and starts the progress of the game by the first player (step S2). When the progress of the game by the first player starts, the game progresser 252 controls the progress of the game in accordance with instruction information input from the first player, stores information such as instruction information and judgment results in accordance with the instruction information. When the game ends, the game progresser 252 stores a game-play-history of the first player, including that information, in the game-play-history storage 235 (step S3).

Then, when a second player inputs instruction information that is a game start request, to the input unit 210 (step S4), the game progresser 252 starts controlling the game progress by the second player, reads out the game-play-history stored in the game-play-history storage 235, and reproduces the game progress by the first player, based on the read-out game-play-history (step S5). In this case, the changer 254 changes the control of game progress, based on the game situation of the first player or the second player (step S6).

In this case, for example, (1) an attribute value of the first player or the second player, (2) instruction information from the first player included in the game-play-history, (3) instruction information input from the second player, (4) a judgment result based on instruction information from the first player and included in the game-play-history, or (5) a judgment result based on instruction information from the second player included in the game-play-history, or the like can be used as the "game situation." An embodiment of the control of such game progress will be specifically described below.

Second Embodiment

Figure 3:
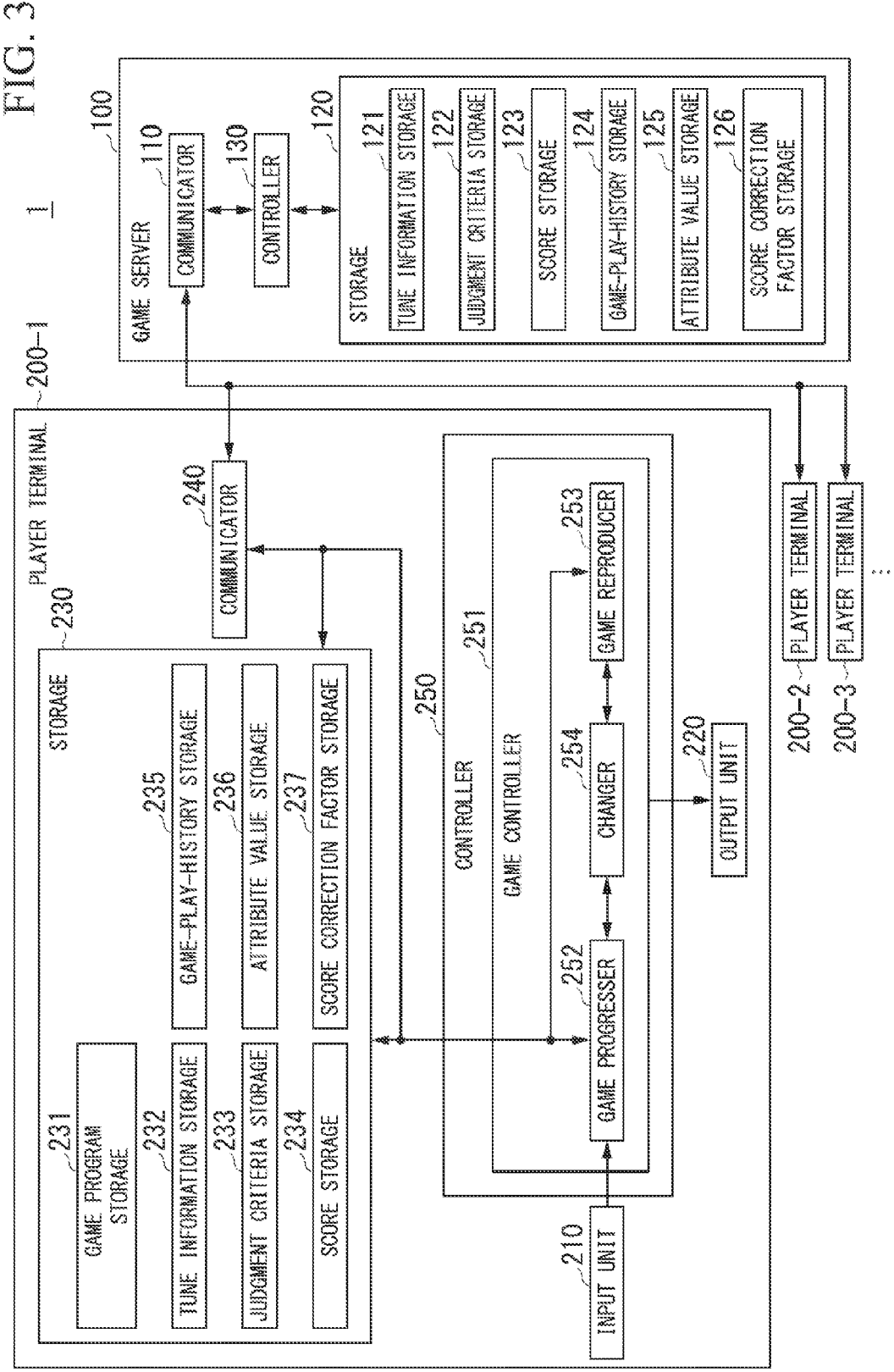
FIG. 3 is a block diagram of another game system in a second embodiment of the invention.

A second embodiment of the present invention will be described. FIG. 3 is a block diagram showing the configurations of a game system 1 according to the present embodiment. The game system 1 may include, but is not limited to, a game server 100, a player terminal 200-1, a player terminal 200-2, a player terminal 200-3, and so on connected to the game server 100 via a network. Each of the game server 100 and the player terminals 200 may be implemented by one or more software components combined with one or more processors. In some cases, the player terminal 200-1, the player terminal 200-2, and the player terminal 200-3 may have the same configurations. Unless particularly distinguished, these will be described as the player terminal 200, with the notation of −1, −2, and the like omitted. Although the illustration and description in this case are for three player terminals 200, rather than three terminals, an arbitrary number of player terminals 200 may be provided in the game system 1. In the present embodiment, elements having the same names as elements described regarding the first embodiment have the same configurations as in the first embodiment.

Figure 4:
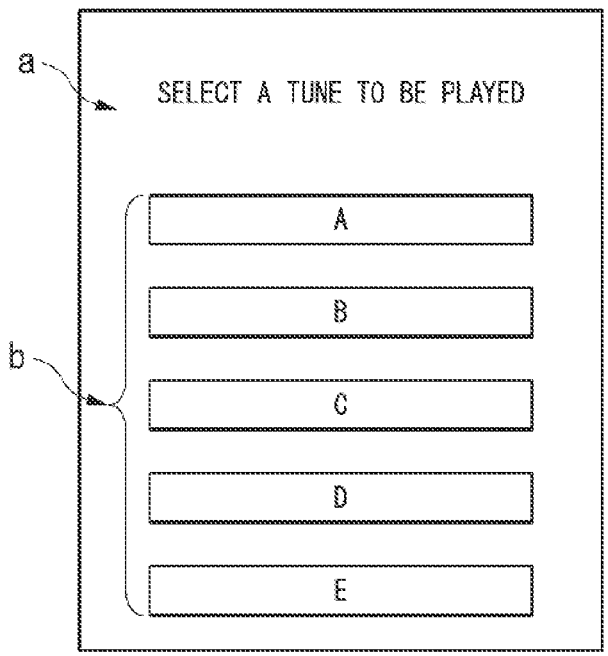
FIG. 4 is a diagram showing an example of a tune selection screen displayed by a player terminal included in the game system in the second embodiment of the invention.

The overview of the game progressed by a player terminal 200 in the present embodiment will first be described. The game in the present embodiment is a timing game, in which points are added in accordance with the timing of the input of prescribed instruction information during the progress of the game, matched to a rhythm or tune of music that is played back. FIG. 4 shows an example of a tune selection screen displayed by the player terminal 200 according to the present embodiment. The region with the symbol a displays characters that prompt the selection of a tune, and the region with the symbol b displays names of candidate tunes which are the subject of playing the game.

Figure 5:
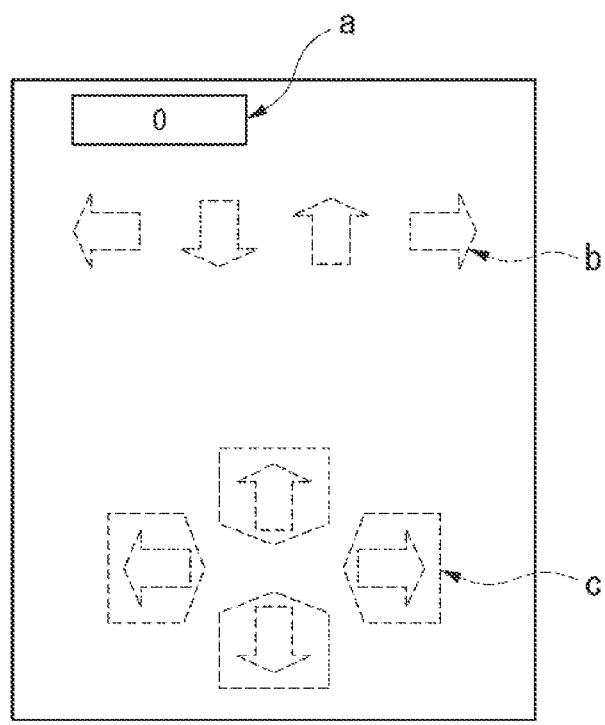
FIG. 5 is a diagram showing an example of an initial screen in a game displayed by the player terminal included in the game system in the second embodiment of the invention.

FIG. 5 shows an example of the initial screen in a game displayed by the player terminal 200 according to the present embodiment. The region with the symbol a displays the player's score. At the start, 0 (points) is displayed. The region with the symbol b displays indicators for the timing of pressing a timing button. In this case, four indicators, these being, in sequence from the left, a leftward arrow indicator, a downward arrow indicator, an upward arrow indicator, and a rightward arrow indicator, are displayed in the same position along the horizontal direction. The region with the symbol c displays timing buttons that are pressed. In this case, four timing buttons, these being a leftward timing button, a downward timing button, an upward timing button, and a rightward timing button, are displayed. When the initial screen is displayed, the tune that was selected in the tune selection screen is played back.

Figure 6:
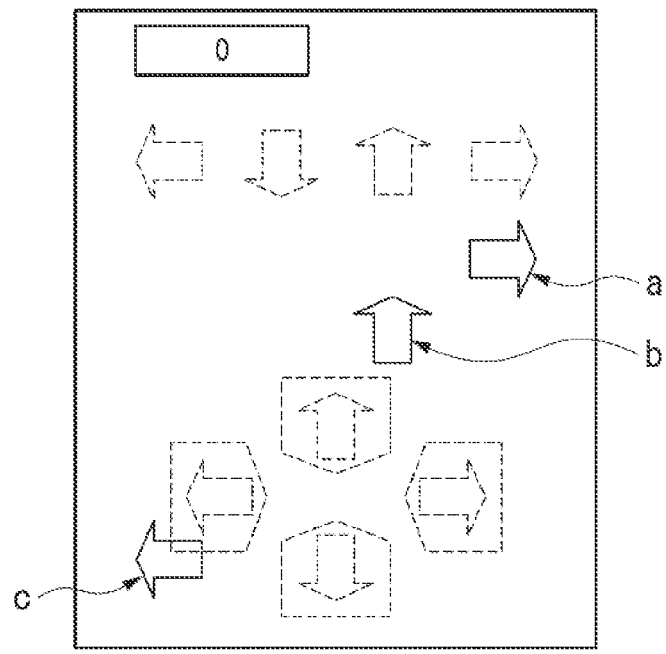
FIG. 6 is a diagram showing an example of a game screen displayed by the player terminal included in the game system in the second embodiment of the invention.

FIG. 6 shows an example of a game screen displayed by the player terminal 200 according to the present embodiment. In the game screen, arrow-shaped objects are displayed with a determined timing to match the played-back tune in the lower part of the display for each column in the vertical direction below the display positions of each of the displayed indicators in the top part of the screen, and in the same direction as the indicators. After being displayed in the lower part of the screen, an arrow-shaped object (hereinafter "arrow object") is displayed so as to move in the vertical direction toward the upper part of the display with the elapse of time. In the drawing, three arrow objects, with the symbols a, b, and c, are displayed.

Figure 7:
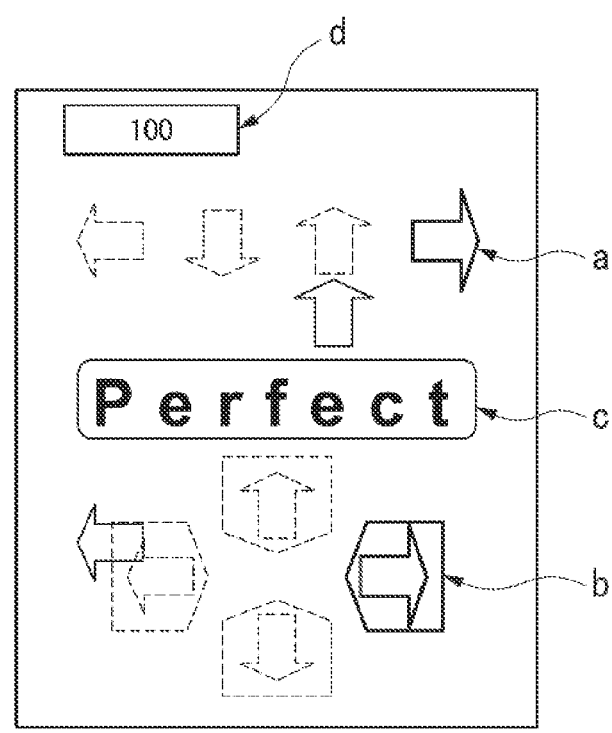
FIG. 7 is a diagram showing an example of a game screen including a timing button, when the timing button is pressed, displayed by the player terminal included in the game system in the second embodiment of the invention.

FIG. 7 shows an example of the screen when a timing button is pressed in the game screen displayed by the player terminal 200 according to the present embodiment. In the condition in which the arrow object with the symbol a approaches or is overlaid with the indicator, if the player presses the timing button corresponding to the arrow object (in this case, the rightward timing button with the symbol b indicating the same direction as the arrow object with the symbol a), a judgment result is judged in accordance with the difference between the displayed position of the arrow object at that point and the displayed position of the indicator. That is, a judgment is made of a judgment result in accordance with the time difference between the point at which the timing button of the same direction as the arrow object is pressed and the time at which the arrow object completely overlaps with the indicator. The smaller the difference, the higher is the evaluation, and the larger the difference, the lower is the evaluation. The region with the symbol c displays characters showing the judgment result. The region with the symbol d displays the total score, to which the additional points obtained in accordance with the judgment result have been added. When the playback of the tune ends, the game ends, and the total score at the final point in time is the score for the player in the game.

Figure 8:
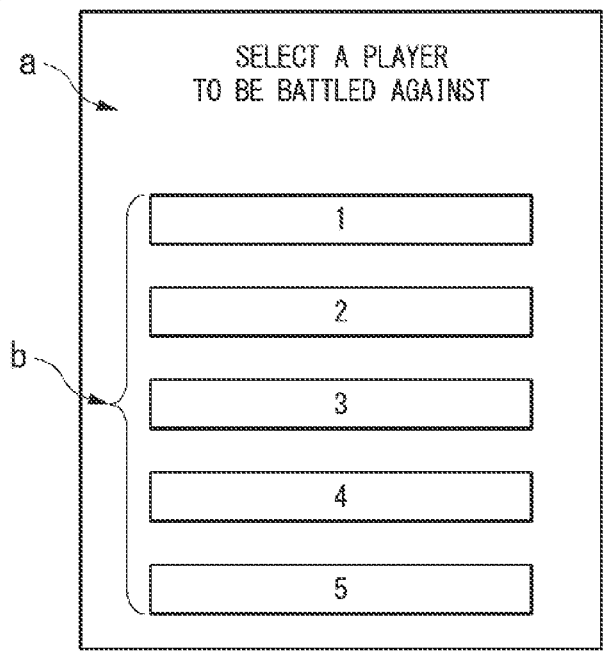
FIG. 8 is a diagram showing an example of an opponent player selection screen displayed by the player terminal included in the game system in the second embodiment of the invention.

In the present embodiment, a game-play-history in accordance with the instruction information input from the player in this manner is stored, and the play progress can be reproduced based on the game-play-history during playing of the game by another player, thereby enabling asynchronous games to be played between players. The player playing the game will be called the main player, and the opponent player playing against the main player and whose play progress is reproduced based on a game-play-history will be called the following player. FIG. 8 shows an example of the opponent player selection screen displayed by the player terminal 200 according to the present embodiment. The region with the symbol a displays characters prompting the selection of the opponent player, and the region with the symbol b displays a list of following players, who are candidate opponent players.

Figure 9:
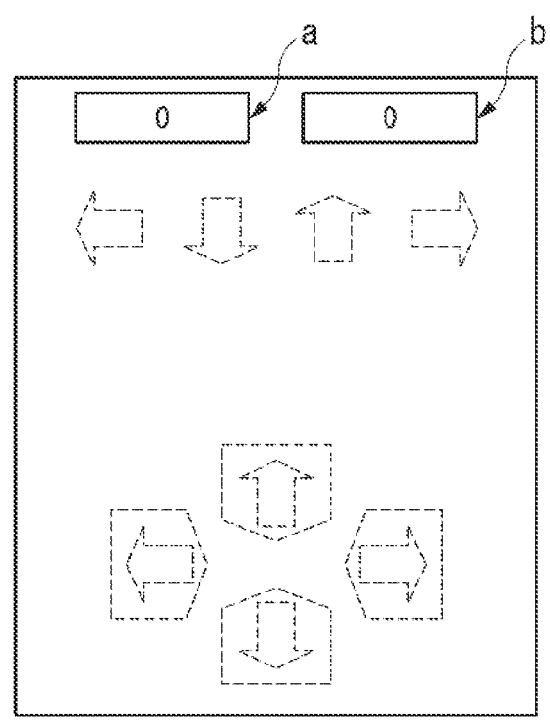
FIG. 9 is a diagram showing an example of an initial screen in a game displayed by the player terminal in the second embodiment of the invention.

FIG. 9 shows an example of the initial screen in a game displayed by the player terminal 200 in accordance with the present embodiment. In this case, the region with the symbol a displays the score of the main player playing the game, and the region with the symbol b displays the score of the following player, whose progress through the game is being reproduced based on a game-play-history. At the starting point of the game, both are displayed as 0 (points). By pressing timing buttons to match the arrow objects appearing in response to the progress of the playback of a tune, the score of the main player is added to, based on the timing of the pressing of the timing buttons. In parallel with this, the score of the following player with respect to the arrow objects is added to, based on the game-play-history. This enables provision of a game between opponents to be played asynchronously between the main player and the following player.

Figure 10:
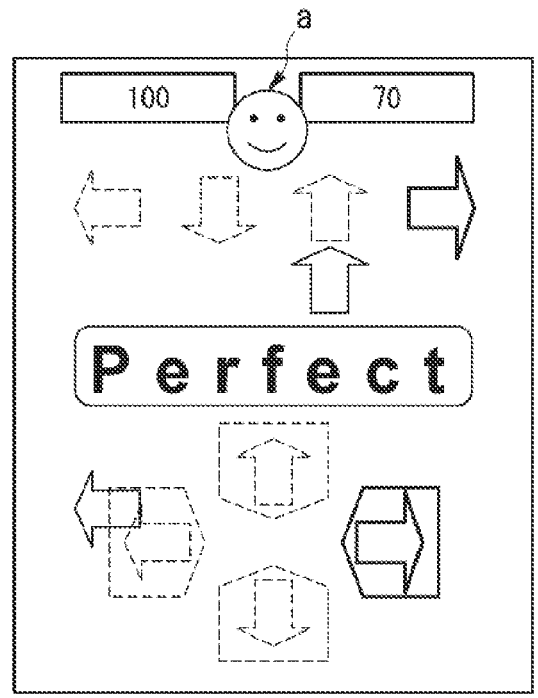
FIG. 10 is a diagram showing an example of a game screen including a timing button, when the timing button is pressed, displayed by the player terminal included in the game system in a second embodiment of the invention.
Figure 11:
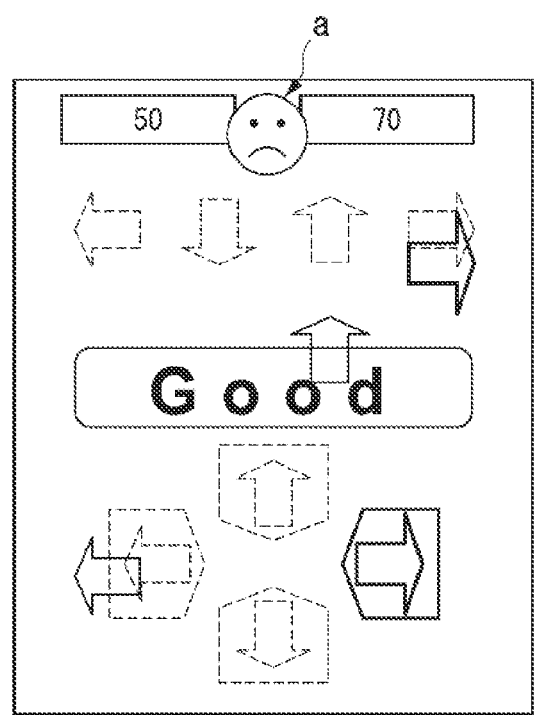
FIG. 11 is a diagram showing an example of a screen displaying a judgment result of a main player which is a lower evaluation than another judgment result of a following player, displayed by the player terminal included in the game system in the second embodiment of the invention.

FIG. 10 shows an example of a screen when a timing button is pressed in a game screen displayed by the player terminal 200 according to the present embodiment. In this case, a comparison is made, with respect to the same arrow object, between the judgment result of the timing of the main player pressing the timing button and the judgment result of the timing of the following player pressing the timing button, that is, the judgment result based on the game-play-history of the following player, and a mark indicating the comparison result is displayed at the region with the symbol a. For example, if the judgment result of the main player is an evaluation that is higher than the judgment result of the following player, a mark having an affirmative meaning, for example, a smiley face or a thumbs up gesture, may be displayed, as shown in the drawing. FIG. 11 shows an example of a screen in the case in which the judgment result of the main player is a lower evaluation than the judgment result of the following player. In this case, a mark with a negative meaning, for example, a frowning face or a thumbs down gesture, may be displayed, as shown in the drawing.

With reference again to FIG. 3, the configuration of the game system 1 in which such a game progresses is made will now be described in detail.

The game server 100 is a computer apparatus connected to the player terminal 200 via a network. The game server 100 may include, but is not limited to, a communicator 110, a storage 120, and a controller 130.

The communicator 110 may be implemented by one or more software components combined with one or more processors. The communicator 110 is configured to communicate with other computers connected via the network.

The storage 120 may be implemented by any storage medium which is available to store any information, or data. Typical examples of the storage 120 may include, but are not limited to, any recording mediums such as RAMs (random access memories), ROMs (read only memories), HDDs (hard disk drives), or any combinations thereof, which stores information used in the progress of a game. The storage 120 is configured to store various information used for the game server 100 to provide a game. The storage 120 may include, but is not limited to, a tune information storage 121, a judgment criteria storage 122, a score storage 123, a game-play-history storage 124, an attribute value storage 125, and a score correction factor storage 126.

The tune information storage 121 can be configured to store information for the tune that is the subject of playing the game, that is, information for the tune replayed during the progress of the game. FIG. 12 is a table showing an example of data of the tune information stored in the tune information storage 121. The tune information includes a tune ID (identifier) and tune data associated therewith, and information of arrow numbers, times, and arrow types. The tune ID is identification information identifying a tune. The tune data is audio data of a music tune identified by the tune ID, and the tune can be played back based on the tune data. Arrow numbers are information identifying a plurality of arrow objects that are displayed during the playback of a corresponding tune. The times are times of coincidence at which the display position of an arrow object moving on the screen coincides with the display position of an arrow indicator on the screen. The coincidence time is made 0 at the start of the playback of a tune and is the relative time from the start of playback indicating the elapsed time from the start of the playback of the tune. The arrow types indicate the upward, downward, leftward, and rightward directions of the corresponding arrow object.

The judgment criteria storage 122 can be configured to store judgment criteria information indicating a judgment criteria for determining the score in accordance with the timing of a player pressing a timing button. FIG. 13 is a table showing an example of the data of the judgment criteria information stored in the judgment criteria storage 122. The judgment criteria indicates a difference between the time at which a player presses a timing button with respect to an arrow object moving on the screen and the time at which the display position of the corresponding arrow object coincides with the display position of an indicator. The time at which a timing button is pressed and the time at which the arrow object display position coincides with the indicator display position is a relative time indicating the elapsed time for both after the start of the playback of the tune. The judgment criteria time is in units of seconds. The judgment result indicates the level of the evaluation relative to the judgment criteria. In this example, if the difference between the time at which the timing button was pressed and the time at which the corresponding arrow object display position coincides with the indicator display position is at least 0.0 second and not greater than 0.2 second, the judgment result is indicated as "Perfect". If the difference is at least 0.21 second and not greater than 0.4 second, the judgment result is "Great". If the different is at least 0.41 second and not greater than 0.8 second, the judgment result is "Good". If the difference is at least 0.81 second, the judgment result is "Bad".

The score storage 123 can be configured to store score information granted to a player in accordance with the judgment result. FIG. 14 is a table showing an example of the data of a score information stored in the score storage 123. In this case, the scores shown are 100 for a judgment result of Perfect, 70 for a judgment result of Great, 50 for a judgment result of Good, and 0 for a judgment result of Bad.

The game-play-history storage 124 can be configured to store a game-play-history of a player. FIG. 15 is a table showing an example of the data stored in the game-play-history storage 124. The game-play-history includes a tune ID, arrow numbers, and judgment results, in association with a player ID. The player ID is information identifying a player playing a game that has been stored a game-play-history. The tune ID is information identifying a tune played back in a game played by a player. The arrow numbers are information identifying arrow objects included in the tune information corresponding to the tune ID. The judgment results are the judgment results in accordance with the timing of the pressing of timing buttons with respect to corresponding arrow numbers when a player plays. That is, the game-play-history includes information wherein judgment results based on prescribed judgment criteria of the points in time when the timing buttons of each arrow object, which are a plurality of tasks in the game, are pressed, in association with each arrow object.

The attribute value storage 125 can be configured to store attribute values for each player. FIG. 16 is a table showing an example of the data of the attribute value information stored in the attribute value storage 125. In this example, a health value is associated as an attribute value with each player ID. The player ID is information identifying a player. The health value is information reduced by a given amount each time a player is selected as an opponent. For example, the upper limit of the health value is 100, and the lower limit of the health value is 0. The initial value of the health value is 100, and, even if it is reduced each time of selection as an opponent, it is restored by addition thereto as real time elapses. For example, the health value is reduced by 10 each time a player is selected as an opponent, after which it is restored by 1 each time 3 minutes have elapsed. This example shows that the current health value of the player with the player ID 1 is 80, and that the current health value of the player with the player ID 2 is 100.

The score correction factor storage 126 can be configured to store score correction factor information indicating a correction factor (coefficient) for the score, in accordance with a judgment result indicating score information to be corrected in accordance with the game situation. FIG. 17 is a table showing an example of data of the score correction factor information stored in the score correction factor storage 126. In this example, the score correction factor is associated with each prescribed range of health value. For example, the score correction factor is 100% when the health value is 100, the score correction factor is 90% when the health value is 80 or greater and not greater than 99%, the score correction factor is 75% when the health value is 50 or greater and not greater than 79, and the score correction factor is 50% when the health value is 0 or greater and not greater than 49%.

The score added to the following player during reproduction of game progress by the following player is computed based on the score correction factor in accordance with the health value of the following player at that time. For example, consider the case in which the health value of the following player with the player ID 1 is 80 and a judgment result with respect to an arrow object with the arrow number 1 in the following player's game-play-history is Perfect. Referring to the score information, the score corresponding to Perfect is 100, and normally (the case in which the health value is 100) 100 would be added. However, because the score correction factor corresponding to 80, which is the health value of the following player, is 90%, 90% of 100 (that is, 90) is added as the score. In this manner, when reproducing the progress through a game of the following player, the control of the progress of the game is changed in accordance with the player's health value.

With reference again to FIG. 3, the controller 130 controls operations of the components of the game server 100.

The player terminal 200 can be implemented by one or more computers including one or more software components combined with one or more processors. The player terminal 200 is to be used by a player. Typical examples of the player terminal 200 can be, for example, a PC (personal computer), a tablet PC, a mobile phone such as a smartphone or feature phone, or a portable information terminal (PDA: personal digital assistant) or the like. In the present embodiment, the player terminal 200 is described as being a smartphone. The player terminal 200 may include, but is not limited to, an input unit 210, an output unit 220, a storage 230, a communicator 240, and a controller 250.

The input unit 210 may be implemented by any user interface that is configured to accept input of instruction information from a player. Typical examples of the input unit 210 may include, but are not limited to, a keyboard, buttons, or a touch panel or the like. The input unit 210 may be configured to accept input of instruction information from a player. For example, the input unit 210 may be configured to accept input of information such as instruction information that is a game start request, instruction information indicating a selected tune, instruction information indicating a selected opponent player, and instruction information indicating that a timing button has been pressed.

The output unit 220 may be implemented by any user interface that is configured to output any types of information in any way. Typical examples of the output unit 220 may include, but are not limited to, a display that is configured to display information such as images and/or a speaker or the like that outputs sound. The output unit 220 may be configured to display a game screen on a display and outputs the audio of a played-back tune to a speaker.

The storage 230 may be implemented by any storage medium which is available to store any information, or data. The storage 230 may be configured to store information used to operate the player terminal 200. The storage 230 may include, but is not limited to, a game program storage 231, a tune information storage 232, a judgment criteria storage 233, a score storage 234, a game-play-history storage 235, an attribute value storage 236, and a score correction factor storage 237.

The game program storage 231 may be implemented by part or whole of any storage medium which is available to store any information, or data. The game program storage 231 may be configured to store a game program that controls the progress of a game such as described above, in accordance with instruction information input from a player. The game program is pre-installed and stored in the game program storage 231.

The tune information storage 232 may be implemented by part or whole of any storage medium which is available to store any information, or data. The tune information storage 232 may be configured to acquire, by the game progresser 252, tune information corresponding to the tune selected by a player from the game server 100, and stores the tune information.

The judgment criteria storage 233 may be implemented by part or whole of any storage medium which is available to store any information, or data. The judgment criteria storage 233 is configured to store judgment criteria information obtained by the game progresser 252 from the game server 100.

The score storage 234 may be implemented by part or whole of any storage medium which is available to store any information, or data. The score storage 234 may be configured to store score information obtained from the game server 100 by the game progresser 252.

The game-play-history storage 235 may be implemented by part or whole of any storage medium which is available to store any information, or data. The game-play-history storage 235 may be configured to store a game-play-history of a player. For example, the game-play-history storage 235 may be configured to store the game-play-history of a game played in the player terminal 200. The game-play-history storage 235, by the game progresser 252, also may be configured to acquire a tune selected by a player and a game-play-history associated with the opponent player from the game server 100, and to store this information.

The attribute value storage 236 may be implemented by part or whole of any storage medium which is available to store any information, or data. The attribute value storage 236 may be configured to acquire, via the game progresser 252, attribute values belonging to an opponent player selected by a player from the game server 100, and to store these values.

The score correction factor storage 237 may be implemented by part or whole of any storage medium which is available to store any information, or data. The score correction factor storage 237 may be configured to store score correction factor information obtained by the game progresser 252 from the game server 100.

The communicator 240 may be implemented by one or more software components combined with one or more processors. The communicator 240 may be configured to communicate with other computers connected via a network.

The game controller 250 may be implemented by one or more software components combined with one or more processors such as a CPU (central processing unit) functioning as the control center. The game controller 250 is configured to control operation of various components of the player terminal 200. The game controller 251 may be implemented by one or more software components combined with one or more processors such as a CPU (central processing unit) functioning as the control center. The game controller 251 is configured to control the progress of a game. The game controller 251 may include, but is not limited to, a game progresser 252, a game reproducer 253, and a changer 254. The game controller 251 may be configured to control the game progress based on a game program stored in the game program storage 231.

The game progresser 252 may be implemented by one or more software components combined with one or more processors. The game progresser 252 is configured to control the progress in a game such as described above, in accordance with instruction information input from the main player.

The game reproducer 253 may be implemented by one or more software components combined with one or more processors. The game reproducer 253 is configured to reproduce the game progress of a following player based on the game-play-history of the following player read-out from the game-play-history storage 235 during progress through the game by the main player. The game reproducer 253 is configured to read out the judgment results from the game-play-history associated with each of a plurality of arrow objects appearing during the payback of a tune, matching the elapsed time of the playback of the tune and adds a score to the following player in accordance with the judgment results.

The changer 254 may be implemented by one or more software components combined with one or more processors. The changer 254 is configured to change the control of the game progress corresponding to the following player, based on the attribute values of the following player stored in the attribute value storage 236. In this case, the changer 254 may be configured to change the control on the game progress, by changing the scoring process in accordance with the judgment results by the game reproducer 253. When the game reproducer 253 adds a score to the following player in accordance with a judgment result, the changer 254 changes the scoring process so that a score computed based on a score correction factor in accordance with the health value of the following player is added. The changer 254 is configured to output the result of comparing the judgment result based on the game-play-history of the following player with respect to an arrow object during a game and the judgment result of judging the instruction information input from the main player with respect to that arrow object, based on prescribed judgment criteria.

Figure 18:
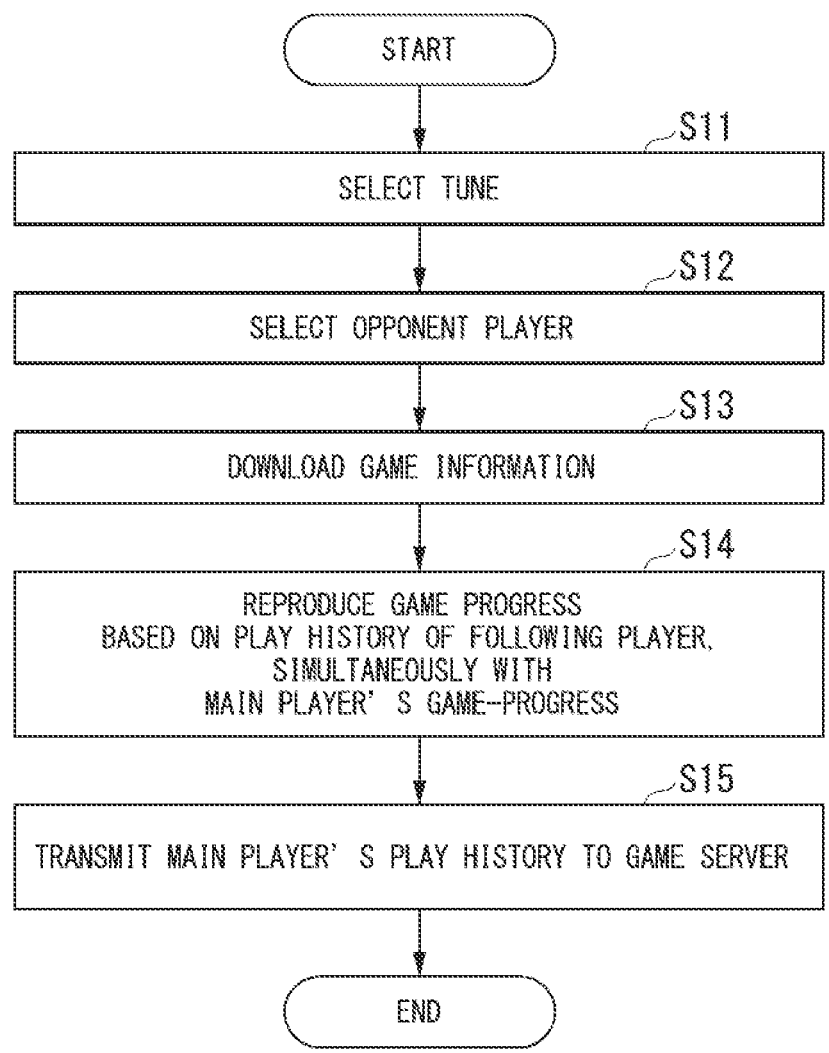
FIG. 18 is a flow chart showing a typical example of a series of operations performed by the game system in the second embodiment of the invention.

An example of the operation of the game system 1 according to the present embodiment will next be described, with references made to drawings. FIG. 18 is a flowchart showing an example of the operation of the game system 1 according to the present embodiment.

In this case, a plurality of play histories of a game played in the player terminal 200 by a plurality of players are assumed to be stored in the game server 100. When the main player inputs a game start request to the player terminal 200, the game controller 251 starts control of the game progress, based on the game program stored in the game program storage 231 of the storage 230. First, the game progresser 252 displays a tune-selection screen on the output unit 220. The input unit 210 accepts input of instruction information of a tune selection input from the main player (step S11).

The game progresser 252 displays an opponent player (following player) selection screen on the output unit 220. The opponent player selection screen displays a list of opponent player candidates. The opponent player candidates are displayed as at least one player identified by a player ID corresponding to a tune ID of a tune selected by the main player in the tune-selection screen in the game-play-history stored in the game-play-history storage 124. The input unit 210 accepts input of instruction information of an opponent player selection input from the main player (step S12). The game progresser 252 transmits to the game server 100 a game information transmission request corresponding to the selected tune ID and the selected player ID, via the communicator 240.

Upon the communicator 110 of the game server 100 receiving the transmission request from the player terminal 200, the controller 130 reads out from the tune information storage 121 tune information corresponding to the selected tune ID. The controller 130 reads out from the game-play-history storage 124 the game-play-history corresponding to the selected tune ID and player ID. The controller 130 also reads out from the attribute value storage 125 the attribute values corresponding to the selected player ID. The controller 130 also reads out the judgment criteria stored in the judgment criteria storage 122, the score information stored in the score storage 123, and the score correction factor information stored in the score correction factor storage 126. The controller 130 then transmits the game information including each of the read-out information to the player terminal 200 via the communicator 110.

Upon receiving the game information transmitted from the game server 100, the game controller 251 of the player terminal 200 stores each information included in the received game information into each corresponding unit of the storage 230 (step S13). The game progresser 252 displays a game screen on the output unit 220 and starts the game. In this case, the game progresser 252 stores the judgment results based on the instruction information input from the main player during the progress of the game by the main player. Simultaneously, the game reproducer 253 reads out the game-play-history stored in the game-play-history storage 235 and reproduces the game progress by the following player according to the game-play-history. When this occurs, the changer 254 changes the scoring process so that the score added to the following player by the game reproducer 253 is a score computed based on a score correction factor according to the health value of the following player (step S14). When the game ends, the controller 250 transmits to the game server 100 the game-play-history, which encompasses the judgment results in the game by the main player (step S15).

Upon receiving the game-play-history of the main player transmitted from the player terminal 200, the controller 130 of the game server 100 stores the game-play-history, in association with the tune ID that was played and the player ID of the main player, into the game-play-history storage 124 of the storage 120.

As described above, when reproducing the game progress of the following player based on the game-play-history, the present embodiment corrects the score of the following player in accordance with the health value of the following player at that point in time, so that the control of the reproduced game progress by the following player changes in accordance with the game situation at that time. This enables prevention of a monotonous game progress of the following player based on the game-play-history and improves enjoyability of the game, by performing scoring process that is disadvantageous to the following player if the health value of the following player is small.

Although the present embodiment changed the scoring process that adds to the score of the following player by a score correction factor in accordance with the health value of the following player, the scoring process may be changed, for example, by changing the judgment result itself in accordance with the health value. For example, if the health value is below a prescribed threshold, scoring process can be done to add a score as if the judgment result had been reduced by a prescribed step. For example, if the health value is below a prescribed threshold, and the judgment result is Perfect, rather than adding the score corresponding to that Perfect, addition to the following player can be done of a score corresponding to Great, which is one step below Perfect.

Third Embodiment

The third embodiment of the present invention will be described. Because the configuration of a game system 1 of the present embodiment is the same as the configuration shown in FIG. 3 as the second embodiment, the characteristic parts of the present embodiment will be described. Whereas in the second embodiment the example shown was one in which the judgment results with respect to each arrow object were stored as the game-play-history, in the present embodiment the times of the player pressing the timing buttons during playing of the game are stored as the game-play-history.

FIG. 19 is a table showing an example of the data of the game-play-history stored the game-play-history storage 124 of the game server 100 and the game-play-history storage 235 of the player terminal 200 in the present embodiment. The game-play-history includes information of a tune ID, arrow numbers, judgment results, pressing direction, and pressing time, in association with a player ID. The player ID, the tune ID, the arrow numbers, and the judgment results are the same as in the game-play-history in the first embodiment. The pressing direction indicates the type of timing button, among the upward, downward, leftward, and rightward timing buttons that was pressed. The pressing time is the time that a timing button was pressed. The pressing time indicates the relative time that has elapsed from the start of the playback of a tune, which is taken as the time 0. In this manner, the game-play-history in the present embodiment includes instruction information input during the game, associated with the time that the instruction information was input.

In the present embodiment, the game reproducer 253 reproduces the game progress of a following player based on such a game-play-history. In this case, the game reproducer 253, following the elapsed time of played-back tune, compares the elapsed time and the pressing time included in the game-play-history, makes a judgment in accordance with the judgment criteria, and performs scoring process that adds a score to the following player corresponding to the judgment result.

The changer 254 changes the control of the game progress based on the pressing time included in the game-play-history. For example, the changer 254, by changing the judgment criteria stored in the judgment criteria storage 233, changes the control of the game progress by changing the scoring process by the game reproducer 253. In the present embodiment, as described above, the game reproducer 253, following the elapsed time from the start of the game, compares the elapsed time and the pressing time included in the game-play-history and judges the judgment result based on the judgment criteria. When the game reproducer 253 makes a judgment of a judgment result based on the judgment criteria, the changer 254 changes the scoring process so that a score is added in accordance with a judgment result for a judgment criteria that is a time width that is reduced by a prescribed time. For example, whereas in the example shown in FIG. 13, the time widths for the judgment criteria are 0.0 to 0.2, 0.21 to 0.4, 0.41 to 0.8, and 0.81 or greater, each time band is shortened by 0.1 second, so that they are 0.0 to 0.1, 0.11 to 0.3, 0.31 to 0.7, and 0.71 or greater. In this manner, by interfering so that the judgment criteria for the following player is made more severe, the progress of the game is controlled so that it becomes difficult for the following player to earn a high score. A change in the scoring process such as this may be made at any time, and, for example, the time width for changing the judgment criteria can be established in accordance with the health value of the following player. For example, the time width for the judgment criteria can be made shorter, the smaller is the health value.

In this manner, because the pressing time itself is included in the game-play-history in the present embodiment, the scoring process in accordance with the pressing time can be changed. In addition to what is described above, the scoring process can alternatively be changed by offsetting the pressing time by a given amount of time in accordance with, for example, the health value of the following player. By including the pressing position rather than the pressing direction in the game-play-history, the scoring process can be changed with greater flexibility. FIG. 20 is a table showing an example of the data in a game-play-history that includes the pressing position. The pressing position is information indicating a coordinate position on the game screen during the progress of a game. In this case, the pressing position is a value of the X coordinate and a value of the Y coordinate on the game screen that is touched during the progress of the game, on the input unit 210, which is a touch panel. By including a pressing position such as this in the game-play-history, the scoring process can be changed by offsetting the pressing position by a given spacing in accordance with, for example, the game situation.

Although the present embodiment shows an example in which control of the game progress of a following player is changed in accordance with an attribute value (health value) of the following player, the control of the game progress of the main player may also be changed in accordance with an attribute value of the following player. Alternatively, the control of the game progress of the main player may be changed in accordance with an attribute value of the main player. Alternatively, the control of the game progress of the following player may be changed in accordance with an attribute value of the main player. Furthermore, although the present embodiment has been shown as an example in which the judgment results were included in the game-play-history, as shown in FIG. 19, the judgment results need not be included in the game-play-history.

Fourth Embodiment

The fourth embodiment of the present invention will next be described. Because the configuration of the game system 1 in the present embodiment is the same as the configuration shown in FIG. 3 as the second embodiment, the characteristic parts of the present embodiment will be described. Whereas the second embodiment shows an example which changes the control of the game progress based on the health value of the following player, the present embodiment changes the control of the game progress of the opponent player in accordance with instruction information during the progress of the game. That is, the game situation that changes the control of the game progress in the present embodiment is a judgment result based on instruction information input from a following player that was included in the game-play-history or instruction information input from the main player, or a judgment result based on instruction information included in a game-play-history, or a judgment result based on instruction information input from the main player.

For example, the changer 254, when the judgment result based on instruction information of pressing a timing button is Perfect for a given number of times consecutively, can change the control of the game so that scoring process of the opponent player is disadvantageous. In this case, for example, if the judgment result is included in the game-play-history, the scoring process can be changed in accordance with that judgment result. If the pressing time rather than the judgment result is included in the game-play-history, the scoring process in accordance with the judgment result can be changed by comparing the pressing time and the judgment criteria. Alternatively, if a player inputs instruction information to use a prescribed item during the progress of a game, the control of the game can be changed so that for a given period of time after that point in time, the scoring process will be disadvantageous to the opponent player. For example, the main player (opponent player) scoring process may be changed in accordance with instruction information of the following player included in the game-play-history, or the scoring process of the following player (opponent player) may be changed in accordance with instruction information from the main player. In this manner, it is possible to change the control of the game progress of the following player reproduced based on the game-play-history in accordance with instruction information of the main player, and it is possible to change the control of the game progress of the main player in accordance with instruction information in the game of the following player reproduced based on the game-play-history. This enables mutual interference in the play between the main player and the following player, even in an asynchronous game using a game-play-history, thereby achieving a highly realistic game against an opponent.

Other Embodiments

Figure 21:
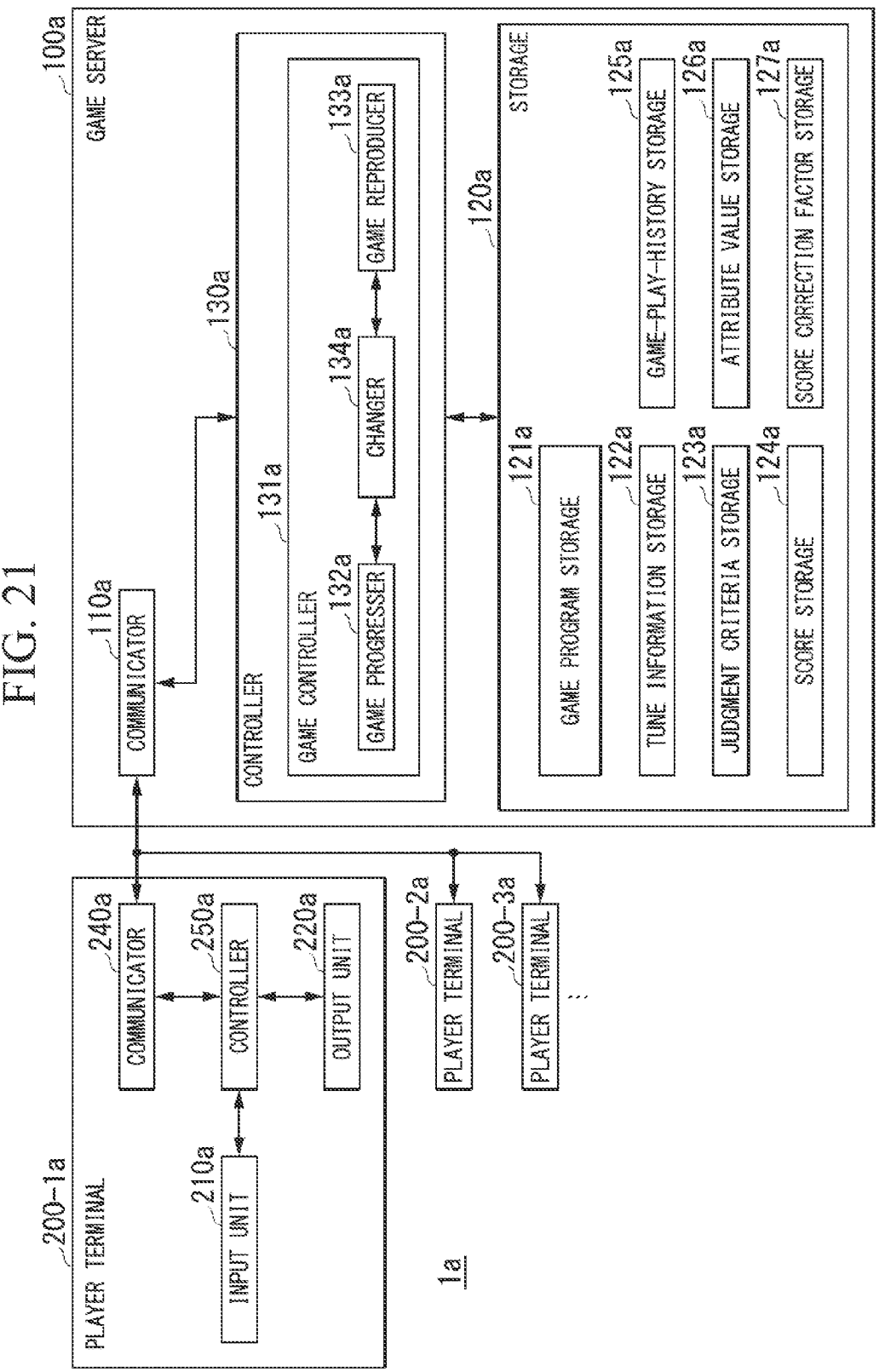
FIG. 21 is a block diagram of another game system in another embodiment of the invention.

Embodiments of the present invention are not limited to the above-described examples, and can take various forms within the scope of the present invention. For example, the various elements of the game system 1 described above can be distributed or concentrated in an arbitrary number of computers, in accordance with a cloud or network environment, the size in number of players, and the number of pieces of and specifications of hardware prepared for constituting the game system 1. FIG. 21 is a diagram showing an example of the configuration of a game system 1a implementing the game system 1 as a cloud game. A cloud game is a form of game in which game control is not done by a game program in a player terminal 200a, but rather is done in a game server 100a. For example, the player terminal 200a transmits instruction information input from a player to the game server 100a, and a game controller 131a of the game server 100a processes game control in accordance with the instruction information transmitted from the player terminal 200a, and transmits a game screen reflecting the processing result in real time to the player terminal 200a. The player terminal 200a displays the game screen transmitted from the game server 100a.

Each of the player terminals 200-1a, 200-2a, 200-3a may include, but is not limited to, an input unit 210a, an output unit 220a, a storage 230a, a communicator 240a and a controller 250a. Respective configurations of the input unit 210a, the output unit 220a, the storage 230a, the communicator 240a and the controller 250a are the same as those configurations of the input unit 210, the output unit 220, the storage 230, the communicator 240, and the controller 250 as described above with reference of FIG. 3.

The game server 100a may include, but is not limited to, a communicator 110a, a storage 120a, and a controller 130a. The communicator 110a may be implemented by one or more software components combined with one or more processors. The communicator 110a is configured to communicate with other computers connected via the network.

The controller 130a may include, but is not limited to, a game controller 131a. The game controller 131a may include, but is not limited to, a game progresser 132a, a game reproducer 133a, and a changer 134a.

The storage 120a is configured to store various information used for the game server 100a to provide a game. The storage 120a may include, but is not limited to, a game program storage 121a, a tune information storage 122a, a judgment criteria storage 123a, a score storage 124a, a game-play-history storage 125a, an attribute value storage 126a, and a score correction factor storage 127a.

The game program storage 121a may be configured to store a game program that controls the progress of a game such as described above, in accordance with instruction information input into the player terminal 200-1a from a player.

The tune information storage 122a may be configured to acquire, by the game progresser 252, tune information corresponding to the tune selected by a player from the player terminal 200-1a, and stores the tune information therein.

The judgment criteria storage 123a may be configured to store judgment criteria information obtained by the game progresser 132a in the controller 131a in the game server 100a.

The score storage 124a may be configured to store score information obtained by the game progresser 132a in the game server 100a.

The game-play-history storage 125a may be configured to store a game-play-history of a player.

The attribute value storage 126a may be configured to acquire, via the game progresser 132a, attribute values belonging to an opponent player selected by a player from the player terminal 200-1a, and to store these values therein.

The score correction factor storage 127a may be configured to store score correction factor information obtained by the game progresser 132a in the game server 100a.

The game controller 131a may be configured to control the game progress based on the game program stored in the game program storage 121a.

The game progresser 132a is configured to control the progress in a game such as described above, in accordance with instruction information input into the player terminal 200-1a from the main player.

The game reproducer 133a is configured to reproduce the game progress of a following player based on the game-play-history of the following player read-out from the game-play-history storage 125a during progress through the game by the main player. The game reproducer 133a is configured to read out the judgment results from the game-play-history associated with each of a plurality of arrow objects appearing during the payback of a tune, matching the elapsed time of the playback of the tune and adds a score to the following player in accordance with the judgment results.

The changer 134a is configured to change the control of the game progress corresponding to the following player, based on the attribute values of the following player stored in the attribute value storage 126a. In this case, the changer 134a may be configured to change the control on the game progress, by changing the scoring process in accordance with the judgment results by the game reproducer 133a. When the game reproducer 133a adds a score to the following player in accordance with a judgment result, the changer 134a changes the scoring process so that a score computed based on a score correction factor in accordance with the health value of the following player is added. The changer 134a is configured to output the result of comparing the judgment result based on the game-play-history of the following player with respect to an arrow object during a game and the judgment result of judging the instruction information input from the main player with respect to that arrow object, based on prescribed judgment criteria.

Figure 22:
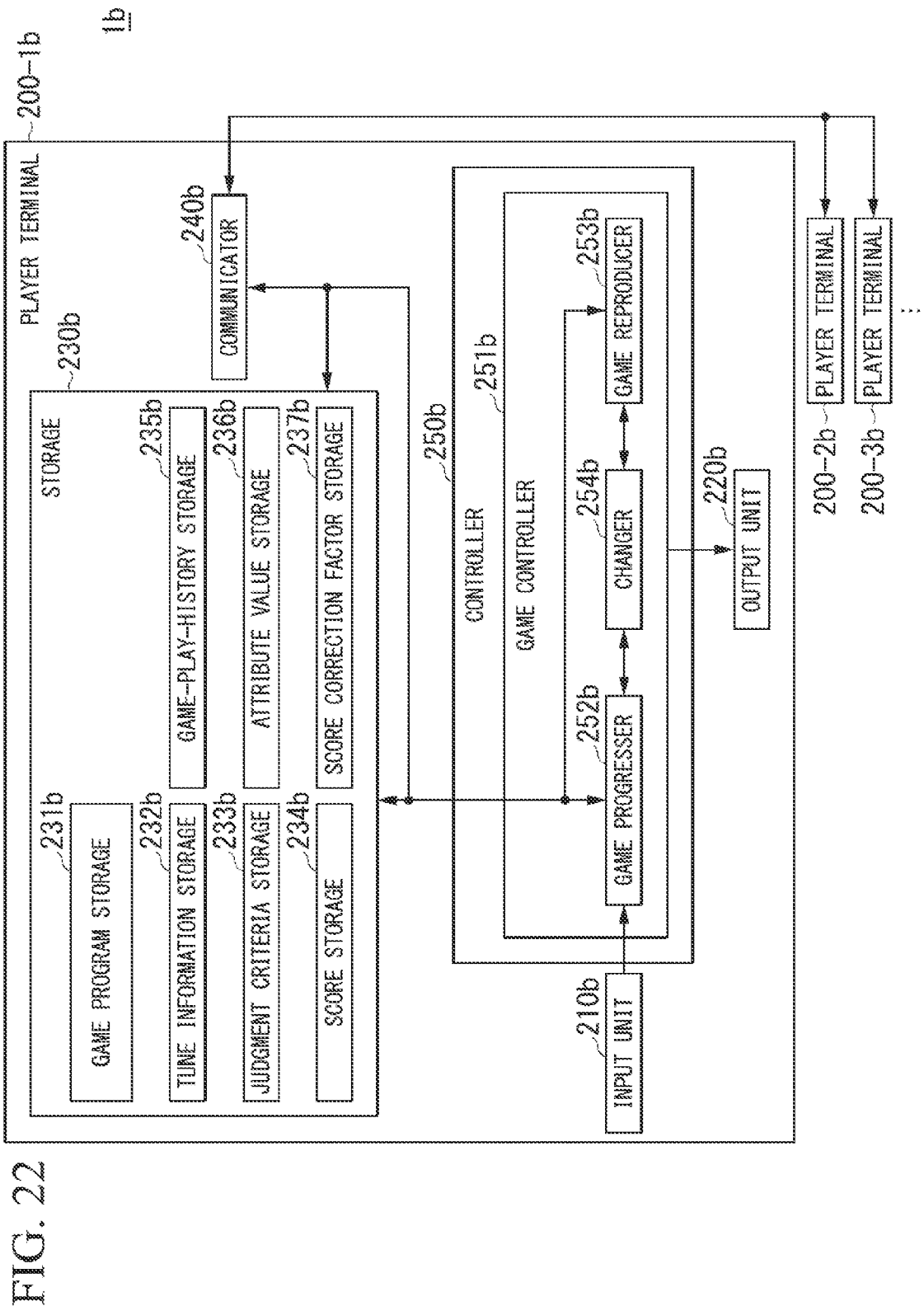
FIG. 22 is a block diagram of another game system in still another embodiment of the invention.

In other cases, a plurality of player terminals 200 can be configured as a transceiver to transmit and receive a game-play-history directly among each another, without going through a game server 100. FIG. 22 is a diagram showing an example of the configuration of a game system 1b for a case in which a plurality of player terminals 200b perform P2P communication to progress through a game. In this case, the plurality of player terminals 200b, by mutually transmitting and receiving a game-play-history among each other, can perform the same type of game control.

The player terminal 200-1b may include, but is not limited to, an input unit 210b, an output unit 220b, a storage 230b, a communicator 240b, and a controller 250b.

The configurations of the input unit 210b, the output unit 220b, the storage 230b, the communicator 240b, and the controller 250b in FIG. 22 are the same as those of the input unit 210, the output unit 220, the storage 230, the communicator 240, and the controller 250b in FIG. 3, respectively.

The storage 230 may include, but is not limited to, a game program storage 231b, a tune information storage 232b, a judgment criteria storage 233b, a score storage 234b, a game-play-history storage 235b, an attribute value storage 236b, and a score correction factor storage 237b. The configurations of the game program storage 231b, the tune information storage 232b, the judgment criteria storage 233b, the score storage 234b, the game-play-history storage 235b, the attribute value storage 236b, and the score correction factor storage 237b in FIG. 22 are the same as those of the game program storage 231, the tune information storage 232, the judgment criteria storage 233, the score storage 234, the game-play-history storage 235, the attribute value storage 236, and the score correction factor storage 237 in FIG. 3, respectively The game progresser 252b is configured to control the progress in a game such as described above, in accordance with instruction information input from the main player.

The game reproducer 253b is configured to reproduce the game progress of a following player based on the game-play-history of the following player read-out from the game-play-history storage 235b during progress through the game by the main player. The game reproducer 253b is configured to read out the judgment results from the game-play-history associated with each of a plurality of arrow objects appearing during the payback of a tune, matching the elapsed time of the playback of the tune and adds a score to the following player in accordance with the judgment results.

The changer 254b is configured to change the control of the game progress corresponding to the following player, based on the attribute values of the following player stored in the attribute value storage 236b. In this case, the changer 254b may be configured to change the control on the game progress, by changing the scoring process in accordance with the judgment results by the game reproducer 253b. When the game reproducer 253b adds a score to the following player in accordance with a judgment result, the changer 254b changes the scoring process so that a score computed based on a score correction factor in accordance with the health value of the following player is added. The changer 254b is configured to output the result of comparing the judgment result based on the game-play-history of the following player with respect to an arrow object during a game and the judgment result of judging the instruction information input from the main player with respect to that arrow object, based on prescribed judgment criteria.

Although the above-described example is one of a timing game, the present embodiment can be also applied to a racing game with motorcycles or automobiles. In this case, the changing of the control of the game progress can be done by changing, for example, the speed of a moving motorcycle or automobile. FIG. 23 is a table showing an example of the data of the game-play-history in a racing game. For example, there is an input unit with up, down, left, and right input keys, an accelerator button, and a brake button, and when an input of instruction information from these is accepted, the input instruction information is stored, in association with the elapsed time (for example, in units of $\frac{1}{1000}$ s) from the start of the game. Game control based on instruction information input in this manner can be included in the game-play-history. FIG. 24 is a table showing an example of data of the game-play-history in which game control based on the instruction information is stored in association with pressing times. In this example, association is made to a value of +1 as the amount of travel with rightward movement when moving to the right, and association is made to a value of −1 as the amount of travel with leftward movement when moving to the left, based on instruction information input to the input keys. If the speed is increased based on instruction information input to the accelerator button, association is made to a value of +1, and if the speed is decreased based on instruction information input to the brake button, association is made to a value of −1 as speed information.

Alternatively, in the case of a game that progresses by a process only, without regard to the elapsed time, such as a card game or solitaire game, the present embodiment can control the game progress. In such cases, the game-play-history includes a process of instruction information input during progress of the game, and the changer 254 changes the control of the game progress based on the process included in the game-play-history. The instruction information in this case is, for example, a selection made by a player in the game. For example, in a case in which the main player and the following player alternately make one move each, the control of the game progress can be changed by, for example, skipping a move of an opponent player in accordance with the game situation. For example, in a shogi (Japanese chess) game, it can be envisioned that instruction information is input alternately by one move at a time from the main player and a following player, to select one piece of that player and move the piece to a selected square. When this is done, as the game progresses based on the input instruction information, by skipping over a procedure of an opponent player in accordance with the game situation, it is possible to change the control of the game progress to the disadvantage of the opponent player.

A program for implementing the functionality of the processing units in the present embodiment may be stored in a computer-readable recording medium, a computer system being made to read out and execute the program stored in the recording medium, so as to perform the processing of the various units of the application system 1. The term "computer system" includes an operating system and hardware such as peripheral devices. The term "computer system" also includes a WWW system having a webpage-providing environment (or webpage-displaying environment). The term "computer-readable recording medium" refers to a removable medium such as a flexible disk, an optomagnetic disk, a ROM, a CD-ROM, or the like, or a storage device such as a hard disk drive or the like built into a computer system. Additionally, the term "computer-readable recording medium" encompasses one holding a program for a given period of time, such as a volatile memory (RAM) within a computer system serving as a server or client in the case in which a program is transmitted via a network such as the Internet or via a communication line such as a telephone line.

The above-noted program may be transferred from a computer system in which the program is stored in a storage apparatus to another computer system, either via a transfer medium, or by a transfer wave in a transfer medium. In this case, the term "transfer medium" transferring a program refers to a medium having a function of transferring information, such as a network (communication network) such as the Internet, or a communication circuit (communication line) such as a telephone line. The above-noted program may be for implementing a part of the above-described functionality. Additionally, it may be a so-called difference file (difference program) enabling a combination with a program that already has recorded the above-noted functionality in a computer system.

The systems and methods in the above-described embodiments may be deployed in part or in whole through a machine that executes computer software, software components, program codes, and/or instructions on one or more processors. The one or more processors may be part of a general-purpose computer, a server, a cloud server, a client, network infrastructure, mobile computing platform, stationary computing platform, or other computing platform. One or more processors may be any kind of computational or processing device or devices which are capable of executing program instructions, codes, binary instructions and the like. The one or more processors may be or include a signal processor, digital processor, embedded processor, microprocessor or any variants such as a co-processor, for example, math co-processor, graphic co-processor, communication co-processor and the like that may directly or indirectly facilitate execution of program codes or program instructions stored thereon. In addition, the one or more processors may enable execution of multiple programs, threads, and codes. The threads may be executed simultaneously to enhance the performance of the one or more processors and to facilitate simultaneous operations of the application. Program codes, program instructions and the like described herein may be implemented in one or more threads. The one or more processors may include memory that stores codes, instructions and programs as described herein. The processor may access a non-transitory processor-readable storage medium through an interface that may store codes, instructions and programs as described herein and elsewhere. The non-transitory processor-readable storage medium associated with the processor for storing programs, codes, program instructions or other type of instructions capable of being executed by the computing or processing device may include but may not be limited to one or more of a memory, hard disk, flash drive, RAM, ROM, CD-ROM, DVD, cache and the like.

It is apparent that the present invention is not limited to the above embodiments, but may be modified and changed without departing from the scope and spirit of the invention.

What is claimed is:

1. A game system comprising:
a game progresser configured to control game progress in accordance with a player's instruction information;
a storage configured to store a game-play-history of a first player in accordance with a first instruction information of the first player wherein the game-play-history includes judgment results of judging the first instruction based on judgment criteria, the first instruction having input with respect to each of a plurality of game tasks in the game, the judgment result being associated with each of a plurality of game tasks;
a game reproducer configured to reproduce a first game progress of the first player based on the game-play-history, during a second game progress progressed by the game progresser in accordance with a second instruction information of a second player; and
a changer configured to compare a first judgment result and a second judgment result, the first judgment result being of judging, based on the game-play-history of the first player, the first instruction information having input with respect to one task in the game, the second judgment result being of judging, based on the judgment criteria, the second instruction information input from the second player with respect to the one task, the changer configured to change the judgment criteria and to change scoring process in accordance with the first and second judgment results based on the judgment criterion, with reference to at least one of a first player's game situation and a second player's game situation.

2. The game system according to claim 1, wherein the changer is configured to refer at least one of: information included in the game-play-history; and the second instruction information of the second player, to change the judgment criteria and to change scoring process.

3. The game system according to claim 1, further comprising:
an attribute value storage configured to store player attribute values associated with each player, and
wherein the changer is configured to change the judgment criteria and to change a scoring process in accordance with the first and second judgment results, based on the attribute values of the player.

4. The game system according to claim 1,
wherein the game-play-history further includes a process of the first instruction information having input during the progress of the game, and
wherein the changer is configured to change the judgment criteria and to change scoring process in accordance with the first and second judgment results, based on the process.

5. The game system according to claim 1,
wherein the game-play-history further includes a time at which the first instruction information has input during the progress of the first game, the time being associated with the first instruction information, and
wherein the changer is configured to change the judgment criteria and to change scoring process in accordance with the first and second judgment results, based on the time.

6. The game system according to claim 1, wherein the changer is configured to change a game point-providing process of providing points in accordance with the timing of input of instruction information during the progress of the game.

7. The game system according to claim 2, wherein the changer is configured to change a game point-providing process of providing points in accordance with the timing of input of instruction information during the progress of the game.

8. The game system according to claim 3, wherein the changer is configured to change a game point-providing process of providing points in accordance with the timing of input of instruction information during the progress of the game.

9. The game system according to claim 4, wherein the changer is configured to change a game point-providing process of providing points in accordance with the timing of input of instruction information during the progress of the game.

10. The game system according to claim 5, wherein the changer is configured to change a game point-providing process of providing points in accordance with the timing of input of instruction information during the progress of the game.

11. A game device comprising:
a game progresser configured to control game progress in accordance with a player's instruction information;
a game reproducer configured to reproduce a first game progress of a first player based on a game-play-history in accordance with a first instruction information of the first player, during a second game progress progressed by the game progresser in accordance with a second instruction information of a second player,
wherein the game-play-history includes judgment results of judging the first instruction based on judgment criteria, the first instruction having input with respect to each of a plurality of game tasks in the game, the judgment results being associated with each of a plurality of game tasks; and
a changer configured to compare a first judgment result and a second judgment result, the first judgment result being of judging, based on the game-play-history of the first player, the first instruction information having input with respect to one task in the game, the second judgment result being of judging, based on the judgment criteria, the second instruction information input from the second player with respect to the one task, the changer configured to change the judgment criteria and to change scoring process in accordance with the first and second judgment results based on the judgment criterion, with reference to at least one of a first player's game situation and a second player's game situation.

12. A game control method comprising:
storing, in a storage, a game-play-history in accordance with a first instruction information of a first player, wherein the game-play-history includes judgment results of judging the first instruction based on judgment criteria, the first instruction having input with respect to each of a plurality of game tasks in the game, the judgment result being associated with each of a plurality of game tasks;
reproducing a first game progress of the first player based on the game-play-history, during a second game progress progressed in accordance with a second instruction information of a second player; and
comparing a first judgment result and a second judgment result, the first judgment result being of judging, based on the game-play-history of the first player, the first instruction information having input with respect to one task in the game, the second judgment result being of judging, based on the judgment criteria, the second instruction information input from the second player with respect to the one task, the changer configured to change the judgment criteria and to change scoring process in accordance with the first and second judgment results based on the judgment criterion, with reference to at least one of a first player's game situation and a second player's game situation.

13. A computer program product including a program embodied on a non-transitory machine-readable medium and to be executed for performing a game control method, the program comprising:
codes for reproducing a first game progress of a first player based on the game-play-history in accordance with a first instruction information of the first player, during a second game progress progressed in accordance with a second instruction information of a second player wherein the game-play-history includes judgment results of judging the first instruction based on judgment criteria, the first instruction having input with respect to each of a plurality of game tasks in the game, the judgment result being associated with each of a plurality of game tasks; and
codes for comparing a first judgment result and a second judgment result, the first judgment result being of judging, based on the game-play-history of the first player, the first instruction information having input with respect to one task in the game, the second judgment result being of judging, based on the judgment criteria, the second instruction information input from the second player with respect to the one task, the changer configured to change the judgment criteria and to change scoring process in accordance with the first and second judgment results based on the judgment criterion, with reference to at least one of a first player's game situation and a second player's game situation.

* * * * *